(12) United States Patent
Wang et al.

(10) Patent No.: US 6,492,976 B1
(45) Date of Patent: Dec. 10, 2002

(54) MULTIPLE-WHEEL INPUT DEVICE

(76) Inventors: Ching Shun Wang, 2F, No. 550, Min Tsu E. Rd., Taipei (TW); Cheng-Liang Hsieh, 7F, No. 142-1, Lane 108, Sec. 1, Kuang Fu Rd., E. Dist., Hsin Chu (TW); Hsin Te Tseng, 4F, No. 19, Shin-Chien St., Pei-Tou, Taipei (TW)

( * ) Notice: Subject to any disclaimer, the term of this patent is extended or adjusted under 35 U.S.C. 154(b) by 0 days.

(21) Appl. No.: 09/425,185

(22) Filed: Oct. 25, 1999

(51) Int. Cl.$^7$ ................................................. G09G 5/00
(52) U.S. Cl. ....................... 345/165; 345/166; 345/157; 250/231.13
(58) Field of Search ................................ 345/163–168; 463/37–38; 250/231.1, 231.13, 231.14–231.18; 200/5 A–5 E; 273/148 B

(56) References Cited

U.S. PATENT DOCUMENTS

| | | | | |
|---|---|---|---|---|
| 5,633,658 A | * | 5/1997 | Ma | 345/161 |
| 5,748,181 A | * | 5/1998 | Fu et al. | 345/165 |
| 5,808,568 A | * | 9/1998 | Wu | 341/20 |
| 5,912,661 A | * | 6/1999 | Siddiqui | 345/166 |
| 6,014,130 A | * | 1/2000 | Yung-Chou | 345/163 |
| 6,100,519 A | * | 8/2000 | Wang et al. | 250/231.13 |
| 6,128,006 A | * | 10/2000 | Rosenberg et al. | 345/163 |
| 6,172,358 B1 | * | 1/2001 | Ho | 250/231.13 |
| 6,300,938 B1 | * | 10/2001 | Culver | 345/156 |

* cited by examiner

Primary Examiner—Lun-Yi Lao
(74) Attorney, Agent, or Firm—Rosenberg, Klein & Lee

(57) ABSTRACT

The present invention provides a multiple-wheel input device comprising a positioning plate, two light-penetrating type encode wheels, a circuit board, and two hollow rollers. The light-penetrating type encode wheel is connected pivotally to both sides of the positioning plate. A gap hole is disposed at the central part of the bottom edge of the positioning plate. Two inclined surfaces are formed at the top edge of the gap hole. An arched board is installed at each side of the gap hole. A fixing bar is installed adjoining to each side of the bottom edge of the gap hole to join the circuit board. A light-emitting device is installed at the central part of the circuit board. A light-receiving device is installed at each side of the light-emitting device. The hollow roller is connected pivotally to the circumference of one side of each encode wheel and outside the two arched boards. When the roller is turned, the encode wheel is jointly turned synchronously. The light emitted from the light-emitting device is reflected by the inclined surface, penetrates the transparent portion of the encode wheel, and is received by the corresponding light-receiving device. The light variation signals are converted to the current variation signals of the light-receiving device. The movements in the X-Y coordinates of the input device (mouse) can thus be known according to the output signals of the encode wheel.

7 Claims, 10 Drawing Sheets

MULTIPLE-WHEEL INPUT DEVICE

FIELD OF THE INVENTION

The present invention relates to a multiple-wheel input device, especially to a mouse that can greatly reduce the production cost, be easily assembled, and enhance the accuracy.

BACKGROUND OF THE INVENTION

The conventional mouse has a tracking ball installed pivotally on the bottom surface of the bottom seat thereof. Its internal circuit unit senses the movement signals in the X-Y coordinates via the rolling of the tracking ball. However, it can not discriminate the movement signals in the Z-axis.

The mouse having the Z-axis movement sensing function has a supporting plate installed above the bottom lid thereof. A shaft set having a roller and an encode wheel in series is assembled on the supporting plate. The top edge of the roller is exposed out of the surface of the top lid of the mouse. An infrared transceiver is installed beside the encode wheel of the mouse. The rotation of the encode wheel is thus controlled via the roller, and the infrared transceiver transfers the signals to acquire the Z-axis input function. However, there is no second X-Y coordinates input device such that the control is not flexible.

The multiple-axis mouse has a mouse driving mechanism and a circuit board installed on the bottom seat thereof. A circuit control unit is installed on the circuit board. Two sets of coordinates input devices are connected pivotally to the circuit board. One set of encode wheels (including an X-axis encode wheel and a Y-axis encode wheel) is installed in each set of coordinates input devices. Part of each encode wheel is exposed out of the corresponding groove of the top lid. An emitting device and a receiving device are installed outside each encode wheel. The emitting device and the receiving device are connected to the circuit control unit. The circuit control unit will control the variation of the second X-Y coordinates according to the received signals of each receiving device and its internal program when each set of encode wheel is under operation. However, the production cost is high, and the assembly is not convenient.

SUMMARY AND OBJECTS OF THE PRESENT INVENTION

Accordingly, one object of the present invention is to provide a multiple-wheel input device wherein an encode wheel is connected pivotally to both sides of a positioning plate. A gap hole is disposed at the central part of the bottom edge of the positioning plate. Two inclined surfaces are formed at the top edge of the gap hole. An arched board is installed at each side of the gap hole. A fixing bar is installed adjoining to each side of the bottom edge of the gap hole to join a circuit board. A light-emitting device is installed at the central part of the circuit board. A light-receiving device is installed at each side of the light-emitting device. A hollow roller is connected pivotally to the circumference of one side of each encode wheel and outside the two arched boards. When the roller is turned, the encode wheel is jointly turned synchronously. The light emitted from the light-emitting device is reflected by the inclined surface, penetrates the transparent portion of the encode wheel, and is received by the corresponding light-receiving device. The light variation signals are converted to the current variation signals of the light-receiving device. The movements in the X-Y coordinates of the input device (mouse) can thus be known according to the output signals of the encode wheel.

Another object of the present invention is to provide a modified multiple-axis mouse wherein an extended board is installed extending from one side of the positioning plate. The extended board laps a micro-movement switch at the bottom seat of the mouse. When the extended board is pressed downwards via the roller, the micro-movement switch will act to control the activation of the coordinate axis.

The various objects and advantages of the present invention will be more readily understood from the following detailed description when read in conjunction with the appended drawings, in which:

DETAILED DESCRIPTION OF THE PREFERRED EMBODIMENTS

Figure 1:
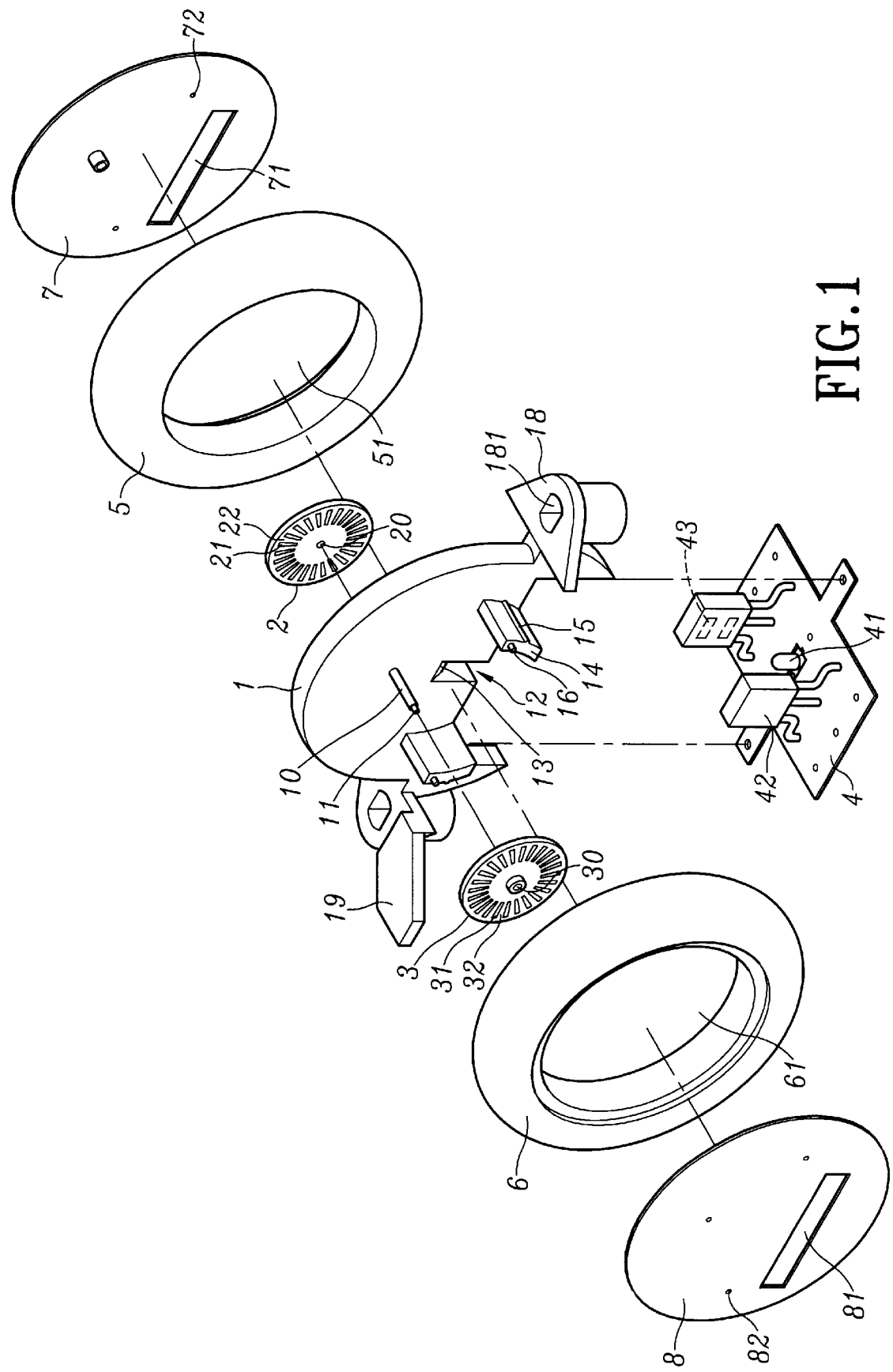
FIG. 1 is an exploded view of the multiple-wheel input device of the present invention.
Figure 2:
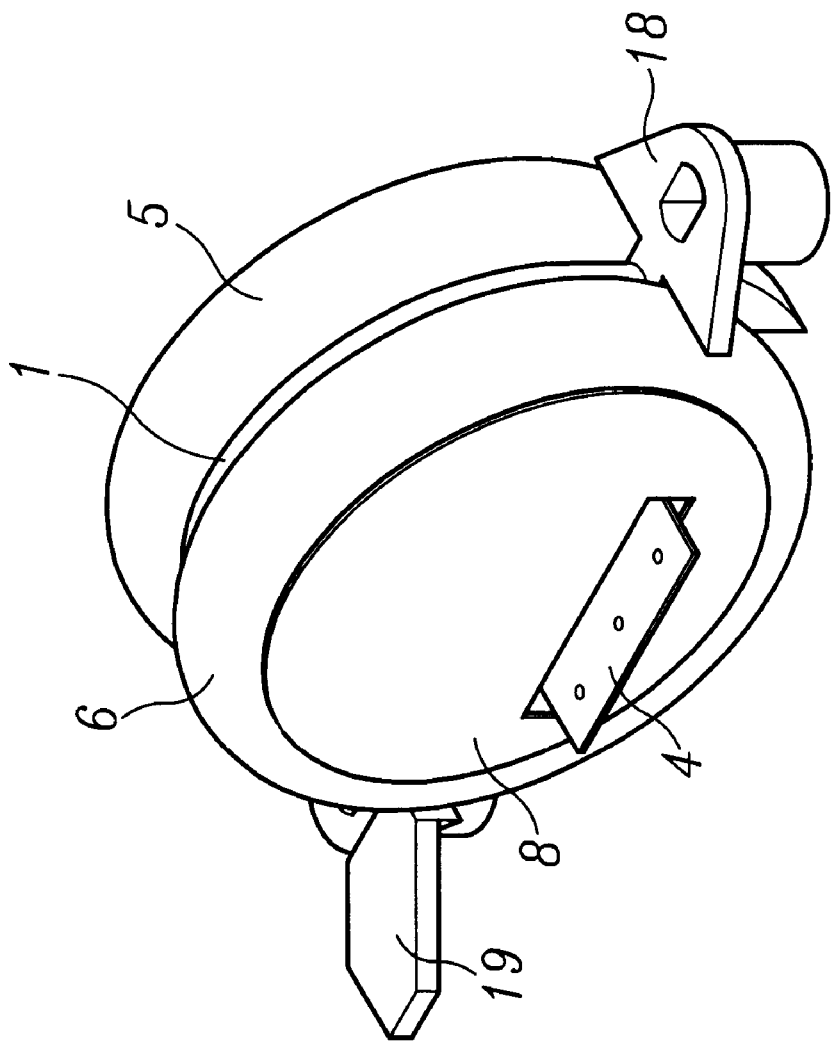
FIG. 2 is an assembly view of the multiple-wheel input device of the present invention.
Figure 3:
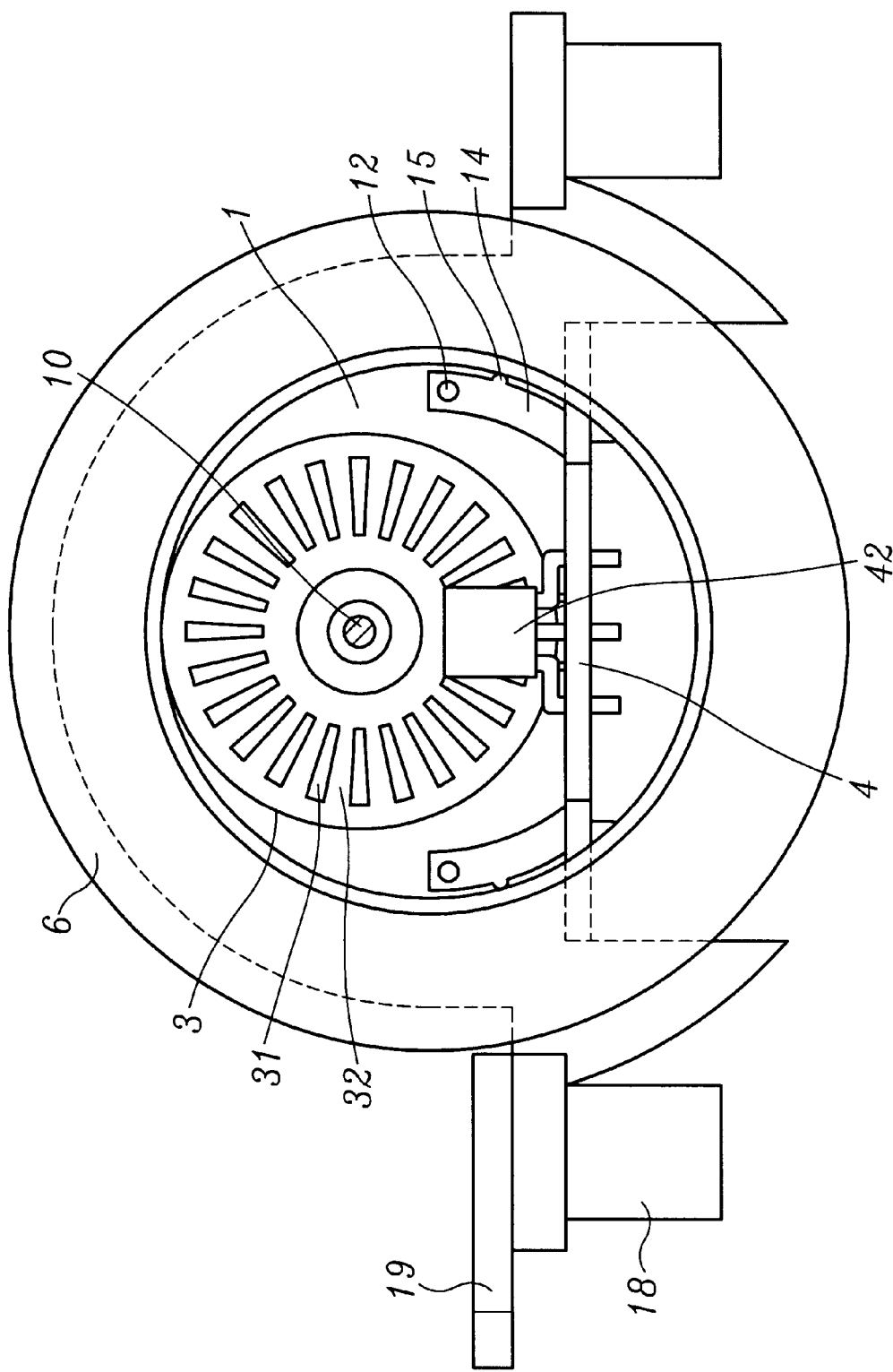
FIG. 3 is a side view of the multiple-wheel input device of the present invention.
Figure 4:
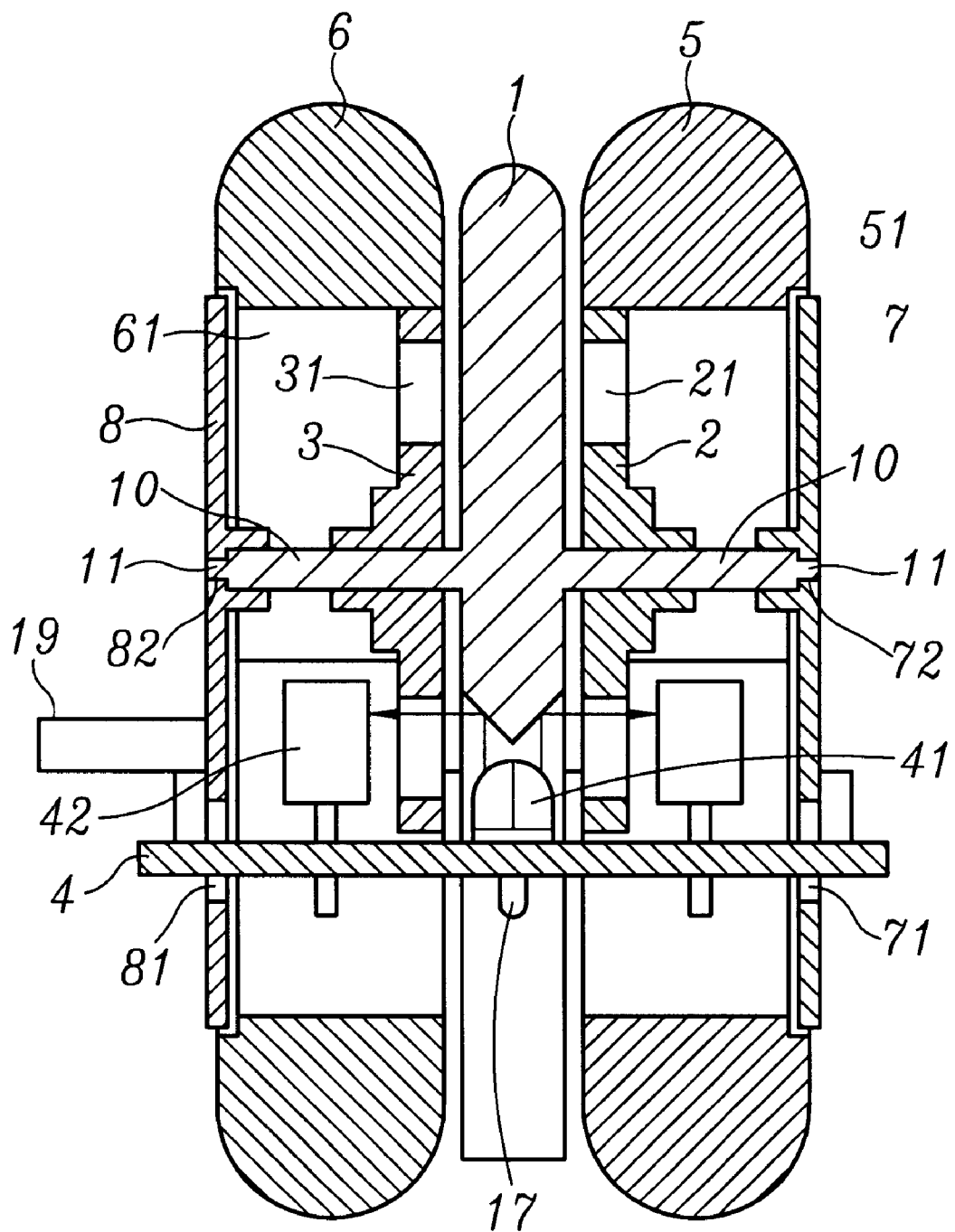
FIG. 4 is a cross-sectional view of the multiple-wheel input device of the present invention.

As shown in FIGS. 1 to 4, a multiple-wheel input device comprises a positioning plate 1, two light-penetrating type encode wheels 2 and 3, a circuit board 4, two hollow rollers 5 and 6, and two side boards 7 and 8.

The positioning plate 1 is generally of arched shape. A shaft 10 is installed at the central part thereof. A projecting edge 11 is installed extending from each end of the shaft 10. A gap hole 12 is disposed exactly under the shaft 10. Two inclined surfaces 13 are formed at the top edge of the gap hole 12. An arched board 14 is installed at each side of the gap hole 12. A projecting rib 15 is installed at the outside surface of each arched board 14. A projecting edge 16 is installed at one side surface adjoining to each projecting rib 15 on the arched board 14. A fixing bar 17 is installed at each side adjoining to the bottom edge of the gap hole 12. A positioning bar 18 is installed extending from each side of the bottom edge of the positioning plate 1. A hollow positioning hole 181 is disposed at each positioning bar 18. An extended board 19 is installed extending from one side of one positioning bar 18.

The shaft 10 penetrates axial holes 20 and 30 of the two light-penetrating type encode wheels 2 and 3 of the positioning plate 1. The two light-penetrating type encode wheels are installed pivotally at the two sides of the positioning plate 1. A plurality of transparent portions 21 (31) are installed annularly on the circumference of the encode wheel 2 (3). An opaque portion 22 (32) is installed between two neighboring transparent portions 21 (31).

The circuit board 4 joins the fixing bar 17 of the positioning plate 1. A light-emitting device 41 is installed at the central part of the circuit board 4. A light-receiving device 42 made of transparent material is installed at each side of the light-emitting device 41. A set of neighboring photosensitive chip 43 is installed in the light-receiving device 42 to receive the light through the transparent portion 21 (31).

The two hollow rollers 5 and 6 are installed respectively at one side of the positioning plate 1. A through hole 51 (61) is disposed at the roller 5 (6). The inside of the through hole 51 (61) is connected pivotally to the outside of the projecting rib 15 and the circumference of one side of the encode wheel 2 (3).

The two side boards 7 and 8 join the two projecting edges 11 and 16 of the positioning plate 1. A rectangular hole 71 (81) is disposed at the lower part of the side board 7 (8) to let the side edge of the circuit board 4 be exposed. A plurality of holes 72 (82) are disposed above the rectangular hole 71 (81) to lag the corresponding projecting edges 11 and 16.

Figure 5:
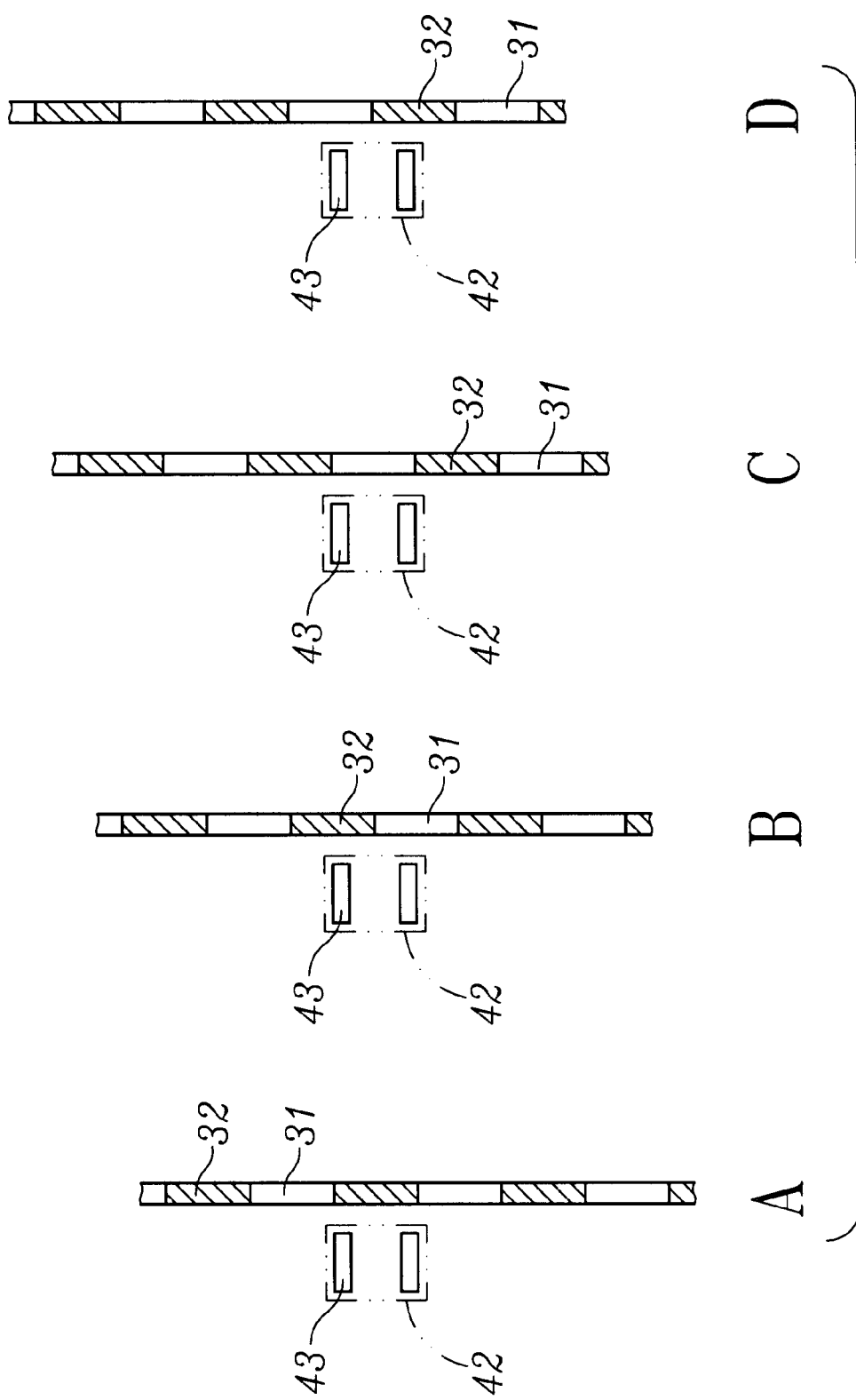
FIG. 5 is a diagram showing four signals of (0,0), (0,1), (1,0), and (1,1) on an oscilloscope when the light-penetrating type encode wheel is turned continuously.

When the roller 5 (6) is turned, the encode wheel 2 (3) is jointly turned synchronously. The light from the light-emitting device 41 will be projected on the inclined surface 13 of the positioning plate 1, and be reflected to the incident surface of the encode wheel 2 (3). The light will be chopped by the transparent portions 21 (31) and the opaque portions 22 (32) of the encode wheel 2 (3) to form a working beam. When the working beam is incident upon the photosensitive chip 43, the signals are obtained. As shown in FIG. 5, if the encode wheel 2 (3) is turned continuously, a sinusoidal waveform is displayed on an oscilloscope. Four signals of (0,0), (0,1), (1,0), and (1,1) can be obtained via a rectifying circuit.

Figure 6A:
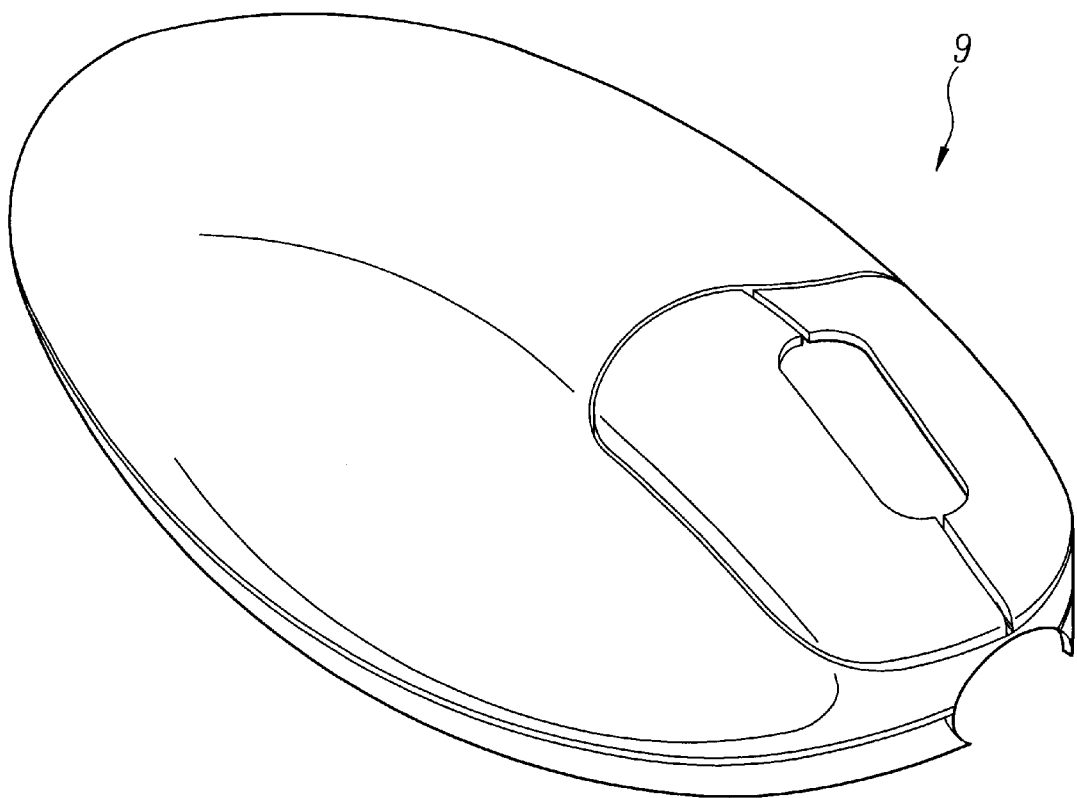
FIG. 6 is a diagram showing the multiple-wheel input device applied to a mouse according to an embodiment of the present invention.
Figure 6:
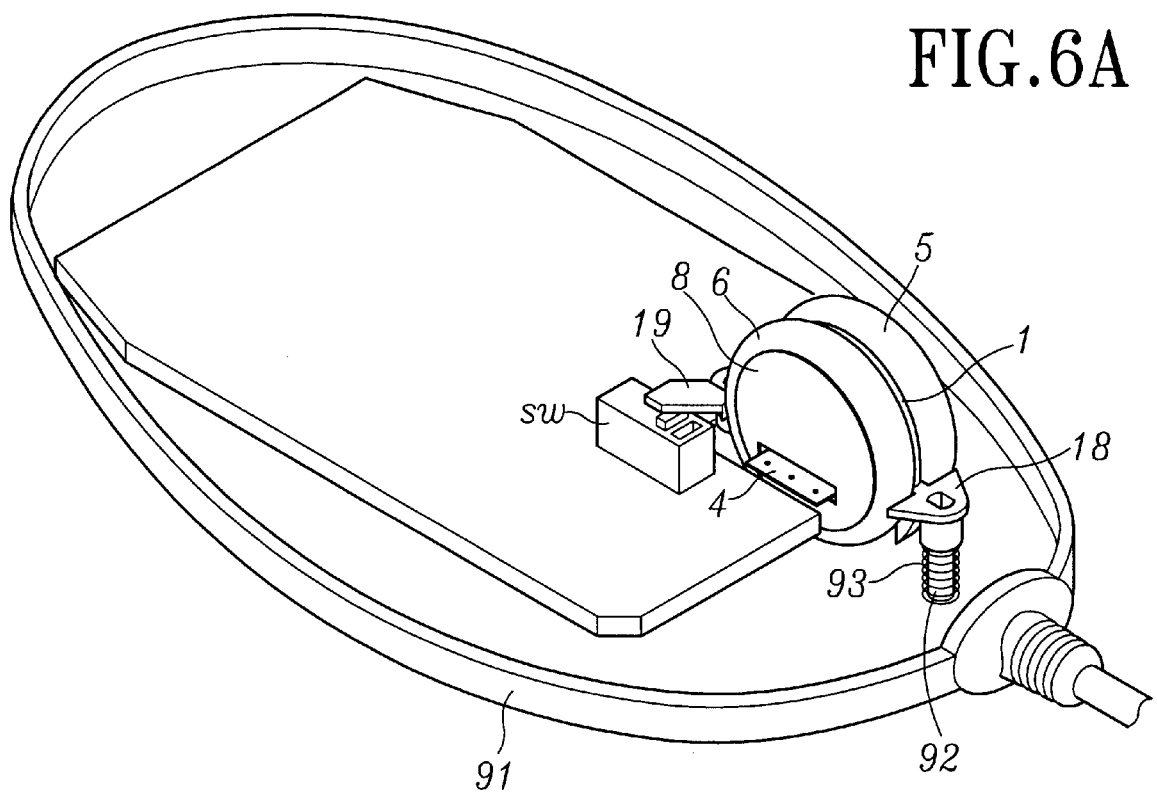
Figure 7:
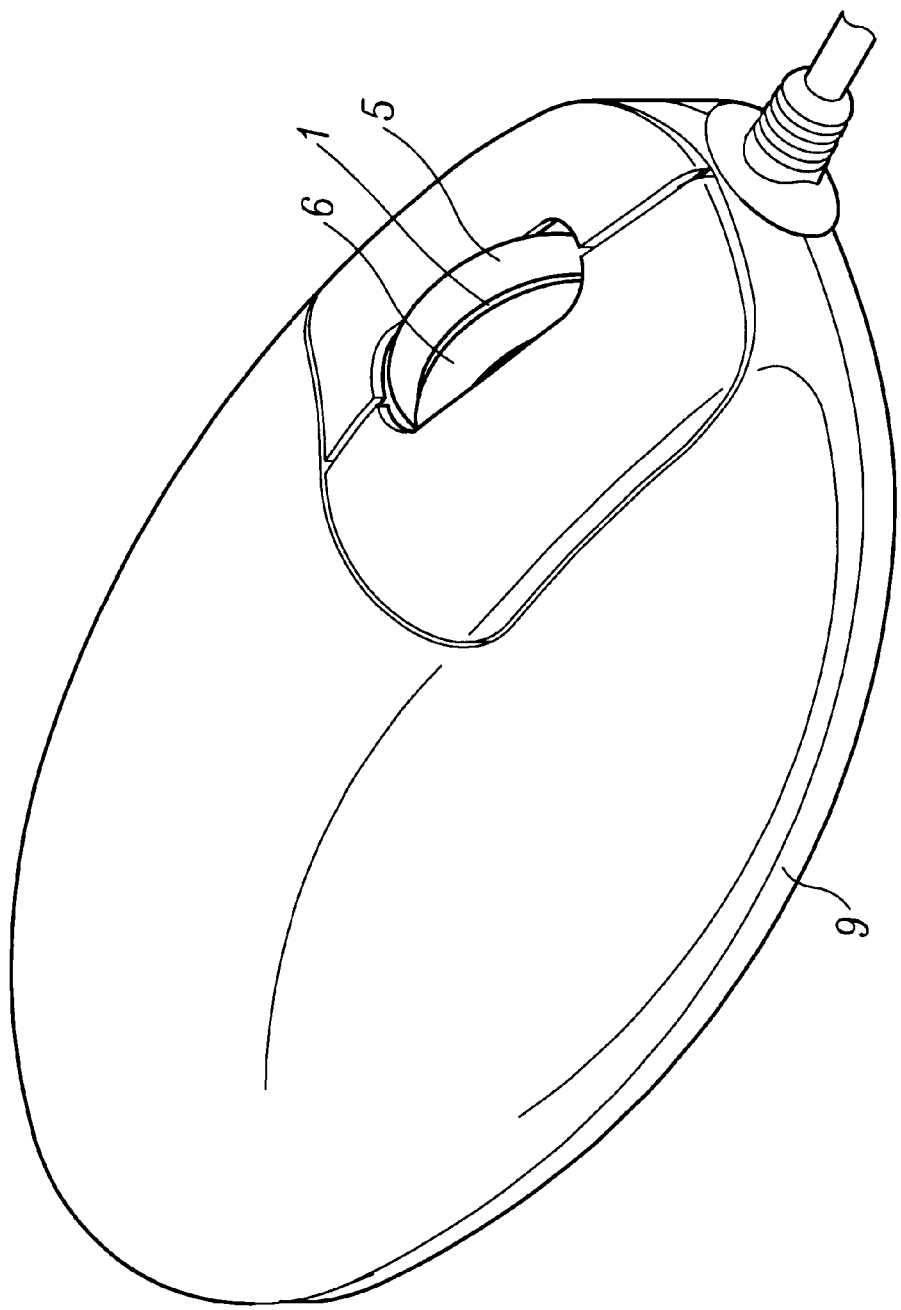
FIG. 7 is a perspective view showing the multiple-wheel input device applied to a mouse according to an embodiment of the present invention.

As shown in FIGS. 6 and 7, the positioning hole 181 of the positioning bar 18 of the positioning plate 1 joins the free end of a supporting bar 92 of a bottom seat 91 of a mouse 9 and sticks to a resilient device 93. The extended board 19 laps a micro-movement switch SW. When the roller is pressed downwards by a user, the extended board 19 will press the micro-movement switch SW and let it act to control the activation of the coordinate axis.

Figure 8:
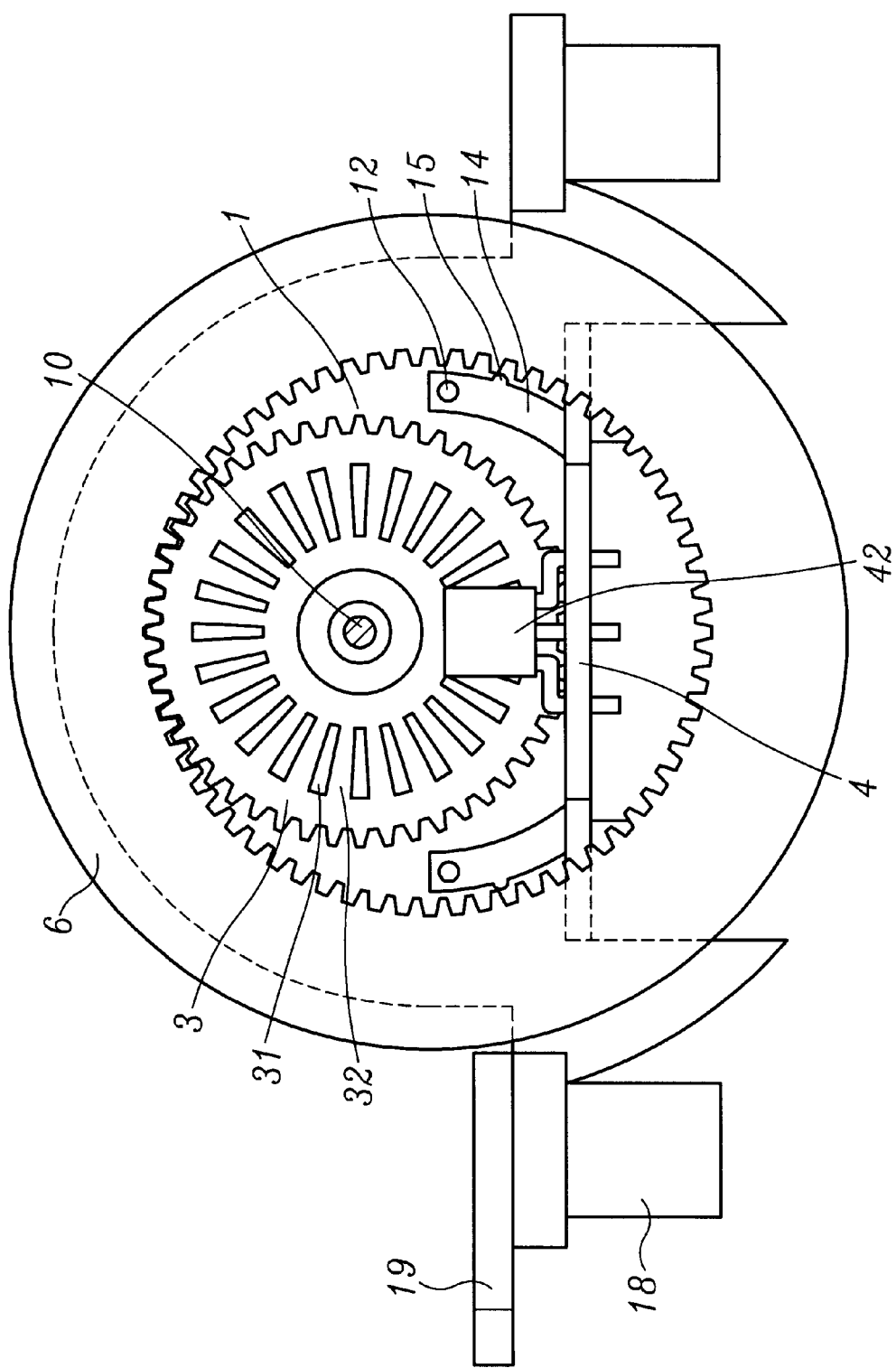
FIG. 8 is a side view of the multiple-wheel input device according to another embodiment of the present invention.

As shown in FIG. 8, the encode wheel 3 (2) can mesh with the roller 6 (5). When the roller 6 (5) is turned, the encode wheel 3 (2) will be jointly turned. The light from the light-emitting device 41 will be reflected by the inclined surface 13, penetrate the transparent portions 31 (21) of the encode wheel 3 (2), and be received by the light-receiving device 42 (43). The light variation signals will be converted to the current variation signals of the light-receiving device 42 (43). The movements in the X-Y coordinates of the mouse 9 can thus be known according to the output signals of the encode wheel 3 (2).

Figure 9:
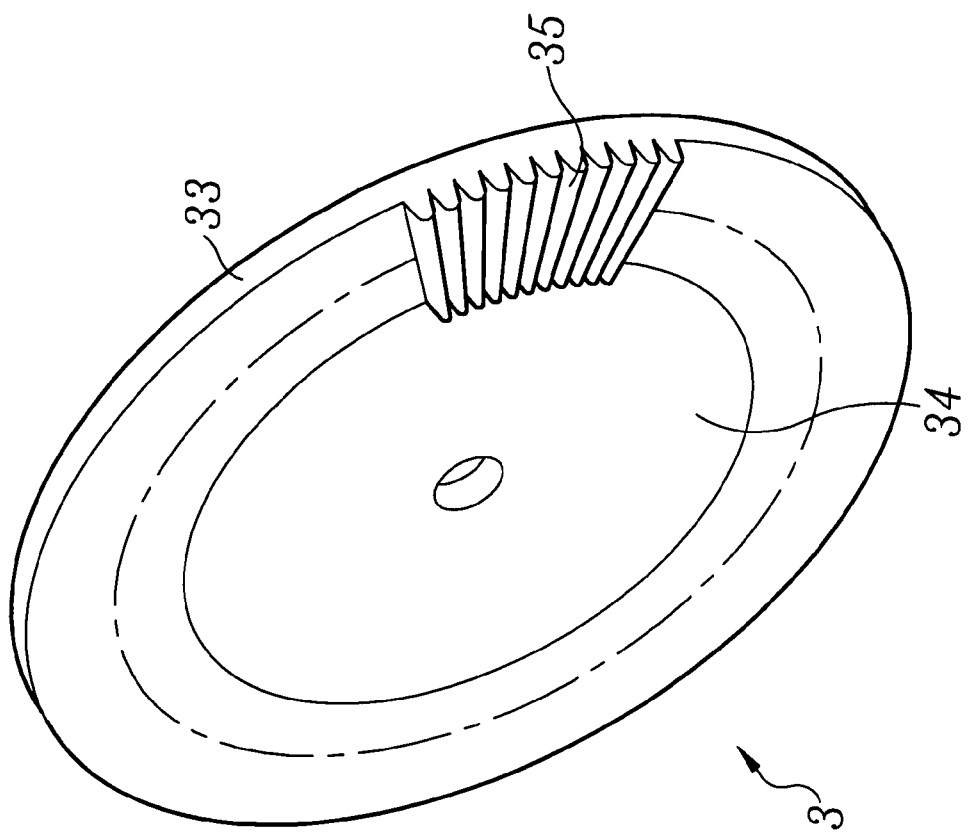
FIG. 9 is a perspective view the multiple-wheel input device with a light-collecting encode wheel replacing the light-penetrating type encode wheel.

As shown in FIG. 9, light-collecting type encode wheels replace the light-penetrating type encode wheels. When the light reflected from the inclined surface 13 of the positioning plate 1 is incident on the incident surface 33 of the encode wheel 3, it will be collected. When the collected light is incident on the emissive surface 34 of the encode wheel 3, it will be collected again by a toothed lens 35.

Figure 10:
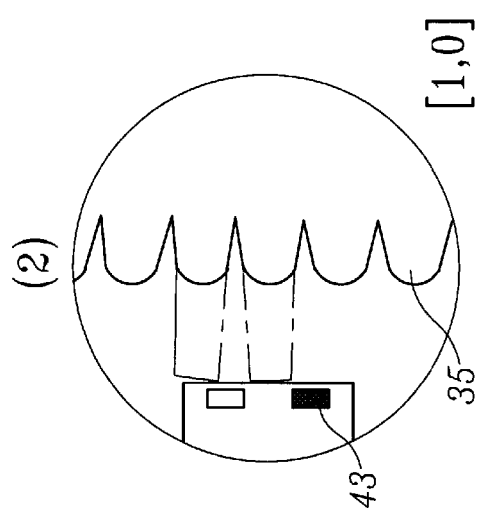
FIG. 10 is a diagram showing four signals of (0,0), (0,1), (1,0), and (1,1) on an oscilloscope when the light-collecting type encode wheel is turned continuously.
Figure 10A:
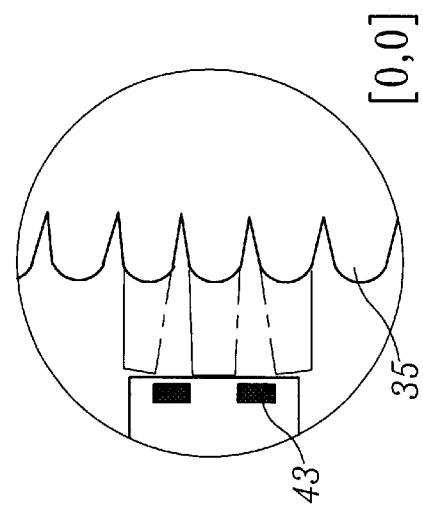
Figure 10B:
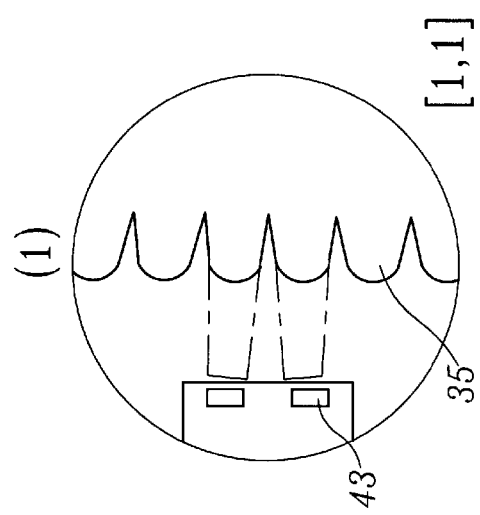
Figure 10C:
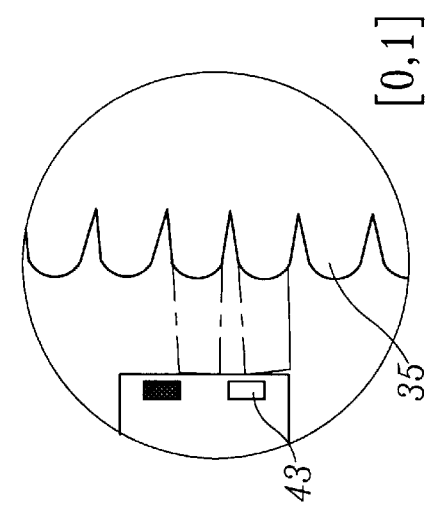

When the encode wheel 2 (3) is turned, the light from the inclined surface 13 is chopped by the teeth of the encode wheel 2 (3) to form a working beam. When the working beam is incident on the photosensitive chip 43, the signals are obtained. As shown in FIG. 10, if the encode wheel 2 (3) is turned continuously, a sinusoidal waveform is displayed on an oscilloscope. Four signals of (0,0), (0,1), (1,0), and (1,1) can be obtained via a rectifying circuit.

To sum up, the signal-hole multiple-wheel input device of the present invention can greatly reduce the production cost, be easily assembled, and enhance the accuracy.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A multiple-wheel input device, comprising:
   a housing, said housing having an opening formed therethrough;
   an internal circuit unit disposed in said housing; and,
   a multiple-wheel signal module disposed in said housing and connected to said internal circuit unit, said multiple-wheel signal module including:
     a positioning plate having a bottom edge with at least one gap hole formed in a predetermined position thereof, at least two inclined surfaces being formed at a top edge of said gap hole, a pair of fixing boards being respectively installed at two sides of said gap hole, and a fixing bar being installed adjoining to a bottom edge of said gap hole;
     at least two light-penetrating type encode wheels, said encode wheels being respectively pivotally installed at two sides of said positioning plate, each of said encode wheels having a plurality of transparent portions annularly spaced on a circumference thereof with an opaque portion disposed between each adjacent pair of said transparent portions;
     a circuit board, said circuit board joining said fixing bar of said positioning plate, said circuit board having a light-emitting device installed in correspondence with said inclined surfaces, said circuit board including a pair of light-receiving devices respectively installed at two sides of said light-emitting device, each light-receiving device receiving light through said transparent portions of a respective one of said encode wheels; and
     at least two hollow rollers, said hollow rollers being respectively installed at two sides of said positioning plate, each of said rollers having a through hole formed therein, an interior surface of said through hole being rotatably supported between an outer side of a corresponding pair of said fixing boards and a perimeter of a corresponding encode wheel;
     whereby when one of said rollers is turned, said corresponding encode wheel will be jointly turned synchronously therewith, light from said light-emitting device being reflected by a respective inclined surface of said positioning plate to pass through said transparent portions of said corresponding encode wheel to form light variation signals received by a corresponding one of said light-receiving devices, the light variation signals being converted to current variation signals of said light-receiving device, wherein directional movements of the input device can thus be detected by the light variation signals from said encode wheels.

2. The multiple-wheel input device of claim 1, wherein said interior surface of each said roller has teeth formed thereon, said teeth being meshingly engaged with corresponding teeth formed on a perimeter of a respective encode wheel.

3. The multiple-wheel input device of claim 1, wherein said positioning plate has an extended board extending from one side thereof for operating a switch of said internal circuit unit.

4. The multiple-wheel input device of claim 1, wherein said positioning plate has a plurality of shafts respectively formed on said two sides thereof, each said shaft providing a pivotal mounting for a corresponding one of said two encode wheels.

5. The multiple-wheel input device of claim 1, wherein each said fixing board has at least one projecting rib formed on an outside surface thereof.

6. The multiple-wheel input device of claim 5, wherein each said fixing board has at least one projecting edge formed on a side thereof adjoining a side of said fixing board having said projecting rib formed thereon.

7. A multiple-wheel input device, comprising:

a housing, said housing having an opening formed therethrough;

an internal circuit unit disposed in said housing; and, a multiple-wheel signal module disposed in said housing and connected to said internal circuit unit, said multiple-wheel signal module including:

a positioning plate having a bottom edge with at least one gap hole formed in a predetermined position thereof, at least two inclined surfaces being formed at a top edge of said gap hole, a pair of fixing boards being respectively installed at two sides of said gap hole, and a fixing bar being installed adjoining to a bottom edge of said gap hole;

at least two light-collecting type encode wheels, said encode wheels being respectively pivotally installed at two sides of said positioning plate, each of said encode wheels having a toothed lens formed thereon;

a circuit board, said circuit board joining said fixing bar of said positioning plate, said circuit board having a light-emitting device installed in correspondence with said inclined surfaces, said circuit board including a pair of light-receiving devices respectively installed adjacent a respective one of said encode wheels for receiving light therefrom; and, at least two hollow rollers, said hollow rollers being respectively installed at two sides of said positioning plate, each of said rollers having a through hole formed therein, an interior surface of said through hole being rotatably supported between an outer side of a corresponding pair of said fixing boards and a perimeter of a corresponding encode wheel;

whereby when one of said rollers is turned, said corresponding encode wheel will be jointly turned synchronously therewith, light from said light-emitting device being reflected by a respective inclined surface of said positioning plate to be emitted by said toothed lens of said corresponding encode wheel to form light variation signals received by a corresponding one of said light-receiving devices, the light variation signals being converted to current variation signals of said light-receiving device, wherein directional movements of the input device can thus be detected by the light variation signals from said encode wheels.

* * * * *